United States Patent [19]

Schaffner et al.

[11] Patent Number: 5,695,021
[45] Date of Patent: Dec. 9, 1997

[54] ELECTRICALLY-POWERED SCOOTER FOR PERSONAL TRANSPORT

[75] Inventors: Walter Schaffner, Shavertown; Walter Kochan, Dallas; Carl Kollar, Nanticoke, all of Pa.

[73] Assignee: Pride Health Care, Inc., Exeter, Pa.

[21] Appl. No.: 152,352

[22] Filed: Nov. 12, 1993

[51] Int. Cl.$^6$ .............................. B62D 61/08; B62K 15/00
[52] U.S. Cl. ........................... 180/208; 180/216; 280/287
[58] Field of Search .......................... 180/208, 11, 907, 180/210, 215, 216, 217, 68.5; 403/102; 280/287, 278, 603

[56] References Cited

U.S. PATENT DOCUMENTS

| | | |
|---|---|---|
| Re. 30,867 | 2/1982 | Gaffney . |
| D. 171,318 | 1/1954 | Wegele . |
| 1,268,229 | 6/1918 | Frank . |
| 1,281,980 | 10/1918 | Kostewich . |
| 1,293,958 | 2/1919 | Smedshammer . |
| 1,296,531 | 4/1919 | Landby . |
| 1,309,305 | 7/1919 | Scheiner . |
| 1,428,907 | 9/1922 | Reigh . |
| 1,459,371 | 6/1923 | Kelly . |
| 1,875,512 | 9/1932 | Silvestri ................................. 280/603 |
| 2,574,199 | 11/1951 | Tandler et al. . |
| 2,594,034 | 4/1952 | King . |
| 2,696,272 | 12/1954 | Schlaphoff . |
| 2,749,997 | 6/1956 | Deslippe . |
| 2,817,406 | 12/1957 | Brewer . |
| 2,886,118 | 5/1959 | Strunk . |
| 2,973,048 | 2/1961 | Jensen . |
| 2,978,251 | 4/1961 | Gerdes . |
| 2,994,546 | 8/1961 | Cooper . |
| 3,042,132 | 7/1962 | Bouffort ................................. 180/208 |
| 3,043,389 | 7/1962 | Steinberg . |
| 3,079,172 | 2/1963 | Burwell . |
| 3,110,352 | 11/1963 | McClarnon . |
| 3,117,648 | 1/1964 | Landreth . |
| 3,190,676 | 6/1965 | Junge . |
| 3,249,171 | 5/1966 | Kinghorn . |
| 3,254,734 | 6/1966 | Behrmann . |
| 3,369,629 | 2/1968 | Weiss . |
| 3,580,349 | 5/1971 | Brennan . |
| 3,664,450 | 5/1972 | Udden et al. . |
| 3,713,502 | 1/1973 | Delaney et al. . |
| 3,891,229 | 6/1975 | Gaffney . |
| 3,933,373 | 1/1976 | Gammelgaard ................. 280/287 |
| 4,037,678 | 7/1977 | Braune . |
| 4,042,054 | 8/1977 | Ward . |
| 4,203,612 | 5/1980 | Feikema ................. 280/287 |
| 4,353,567 | 10/1982 | Weldy . |
| 4,452,327 | 6/1984 | Mowat et al. . |
| 4,460,057 | 7/1984 | Kohyama . |
| 4,469,188 | 9/1984 | Mita . |
| 4,541,501 | 9/1985 | Kawasaki . |
| 4,570,739 | 2/1986 | Kramer . |
| 4,633,962 | 1/1987 | Cox et al. . |
| 4,771,840 | 9/1988 | Keller . |
| 4,892,166 | 1/1990 | Gaffney . |
| 4,909,525 | 3/1990 | Flowers ................. 280/30 |
| 4,947,955 | 8/1990 | Hopely, Jr. ................. 180/208 |
| 5,020,624 | 6/1991 | Nesterick et al. . |
| 5,074,372 | 12/1991 | Schepis ................. 180/208 |
| 5,150,762 | 9/1992 | Stegeman et al. . |
| 5,228,533 | 7/1993 | Mitchell ................. 180/208 |
| 5,238,082 | 8/1993 | Stegeman et al. . |

FOREIGN PATENT DOCUMENTS

| | | |
|---|---|---|
| 1064076 | 5/1954 | France . |
| 2127364 | 4/1984 | United Kingdom . |

*Primary Examiner*—Paul N. Dickson

[57] ABSTRACT

An electrically-powered scooter vehicle for use by elderly, disabled and infirm people includes a self-locking connection means for connecting front and rear frame portions of the scooter. The scooter is convertible between three-wheel and four-wheel versions without use of tools. Automatic shut-off circuity minimizes inadvertent loss of battery power due to failure to turn off the scooter. An adjustably lockable telescoping tiller facilitates use of the scooter by persons of all sizes.

5 Claims, 15 Drawing Sheets

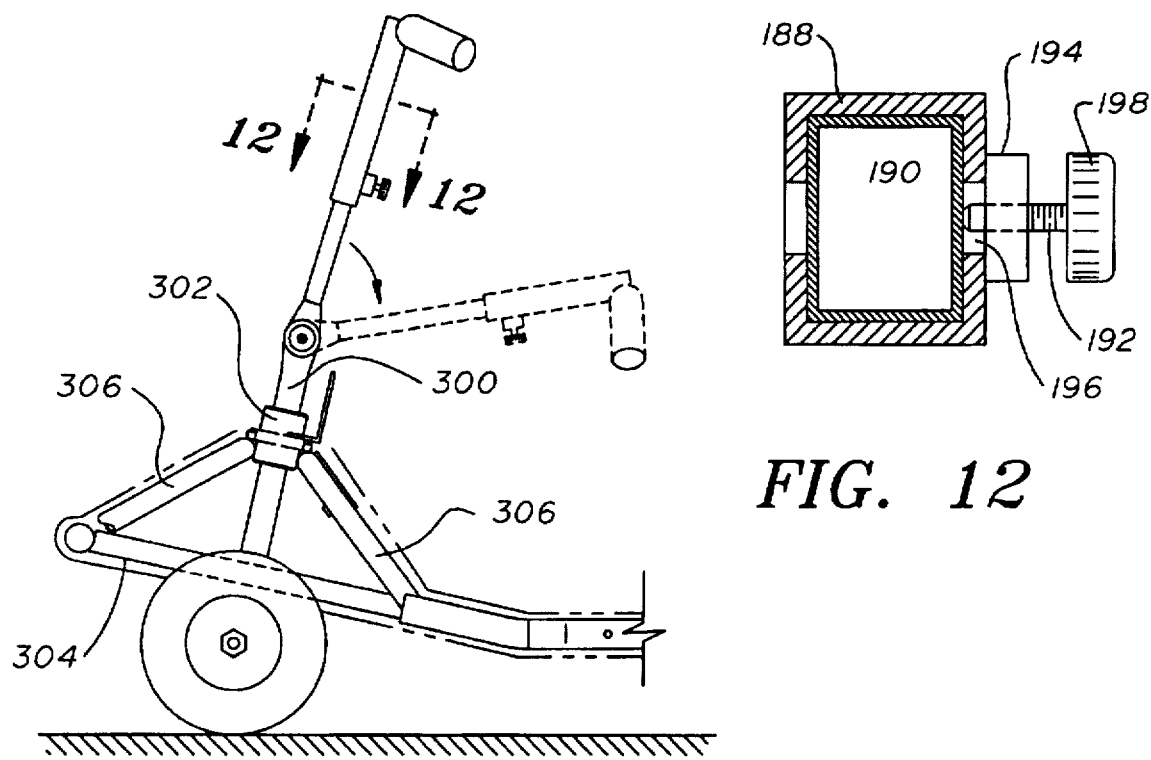
FIG. 10
FIG. 12
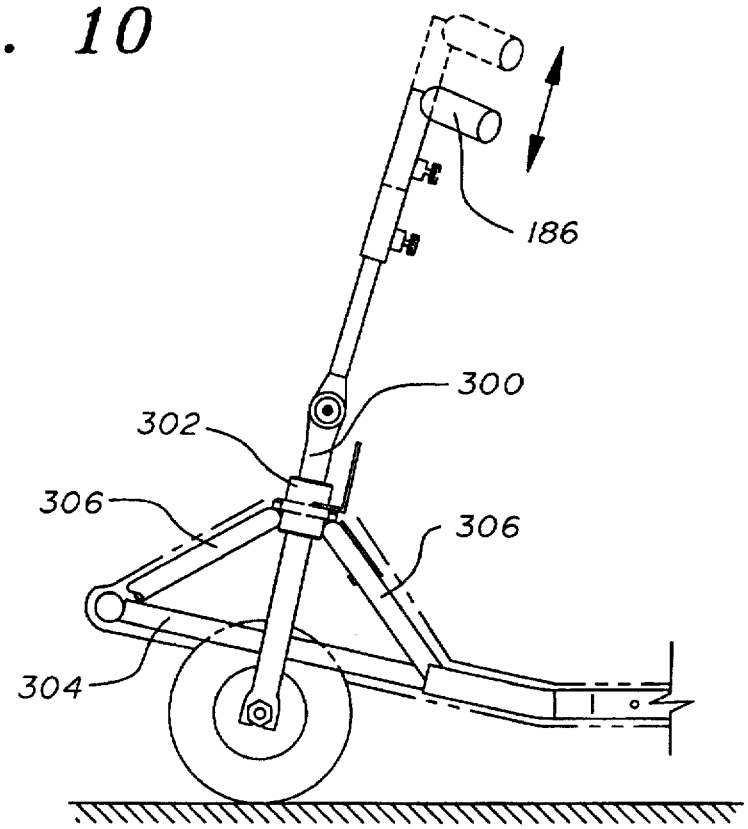
FIG. 11

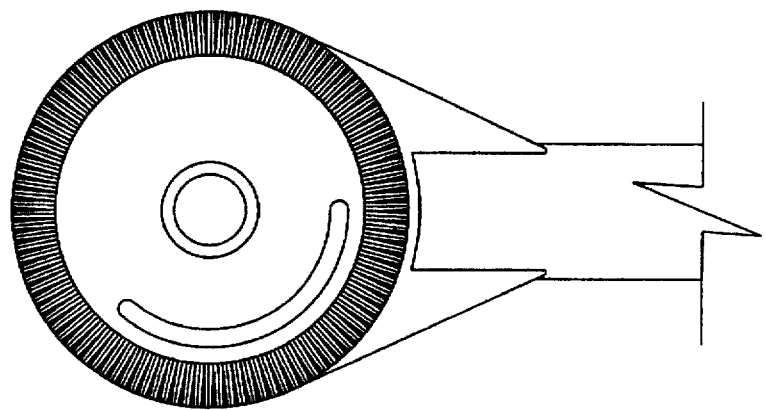
FIG. 16
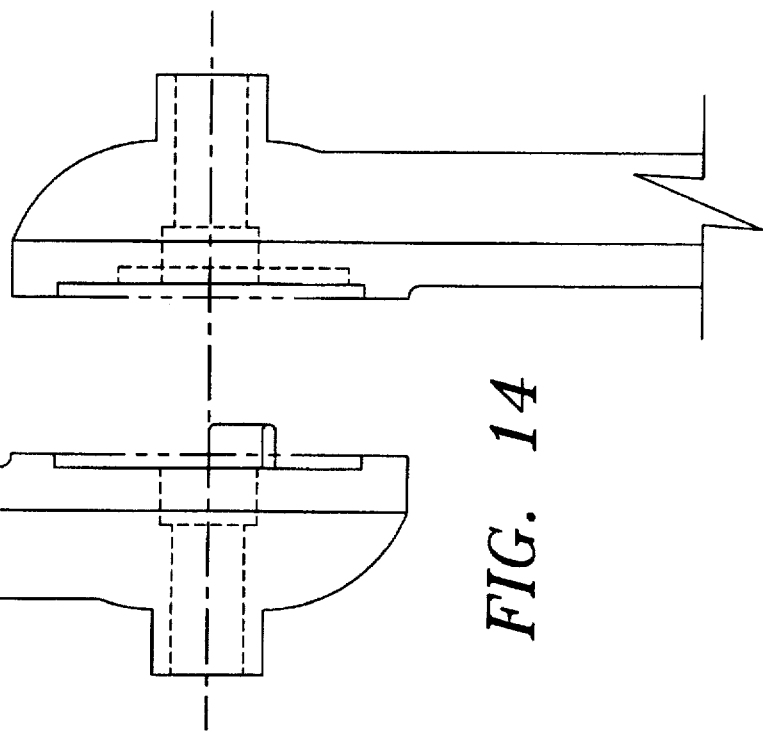
FIG. 15
FIG. 14
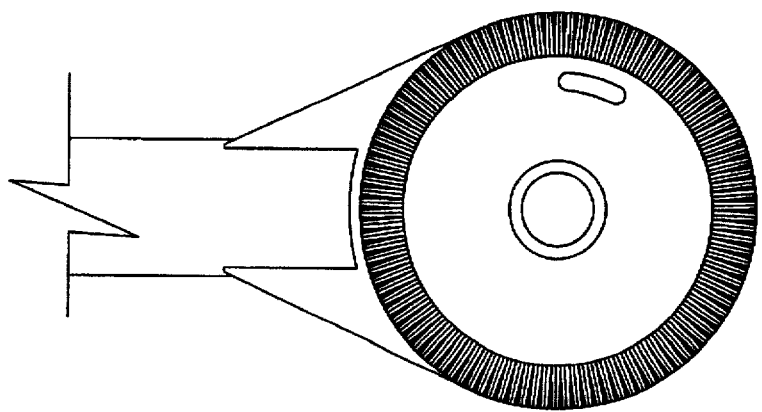
FIG. 13

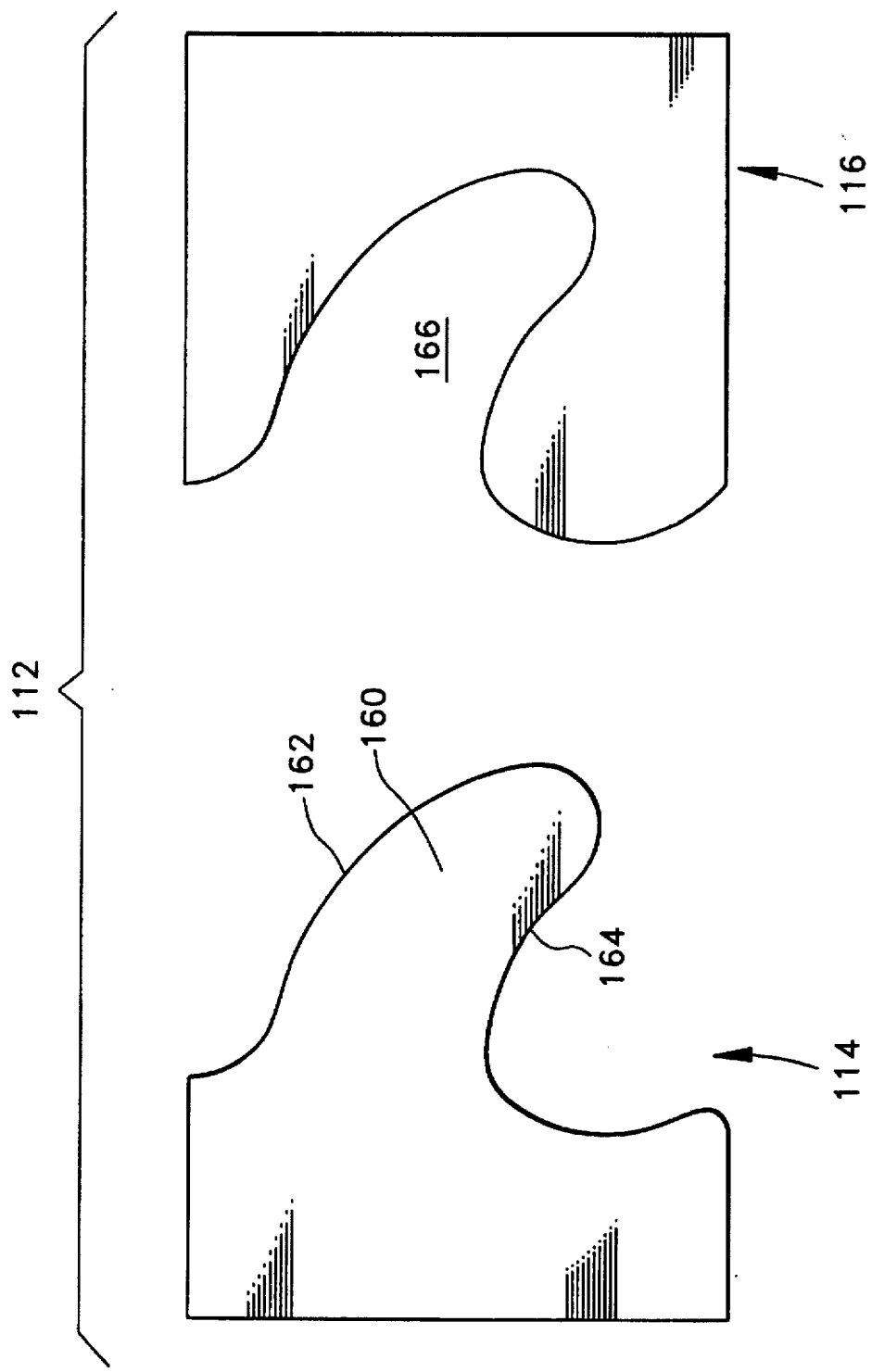

ELECTRICALLY-POWERED SCOOTER FOR PERSONAL TRANSPORT

BACKGROUND

1. Field of the Invention

This invention is in the field of electrically-powered scooter vehicles for use principally by elderly, disabled or infirm individuals, both inside and out-of-doors. The invention has numerous aspects improving such scooter vehicles, to make such scooter vehicles safer, more reliable and more convenient. The numerous aspects of the invention may be practiced individually or in various combinations.

2. Description of the Prior Art

Electrically-powered scooter vehicles for use by elderly, disabled and infirm persons are known and are increasingly widely used by such persons for personal transport, both indoors and outdoors, throughout areas where such persons would walk but for their disability or infirmity. These scooter vehicles are typically disassemblable so that the vehicles may be transported in the trunk of a conventional automobile from one locale to another and reassembled at the second locale for use by an elderly, disabled or infirm person.

A typical scooter of this type for use by elderly, disabled and infirm persons is disclosed in U.S. Pat. No. 4,570,739.

The scooter vehicle disclosed in '739 is a three-wheel or tricycle-type scooter vehicle.

With increasingly wide use of such scooter vehicles by elderly, disabled and infirm individuals, there is demand for vehicles of increased stability over that typically provided by a three-wheel or tricycle-type vehicle. In response to that demand, four-wheel scooter vehicles have been developed, as have scooter vehicles with interchangeable frame members so that the scooter may be provided in both three-wheel and four-wheel versions. A scooter vehicle convertible between three and four wheels is disclosed in U.S. Pat. No. 4,909,525.

The most commercially successful ones of these scooter vehicles have typically been scooters having rear wheel drive. This is because the rear wheels typically bear the weight, or at least a substantial portion of the weight, of the rider-operator of the scooter vehicle. This arrangement provides good traction for the rear, preferably driving wheels of the scooter vehicle.

Front wheel drive scooters, while having the inherent disadvantage of carrying most of the operator's weight on the rear idler wheels, have nevertheless enjoyed some degree of commercial success.

These disassemblable electrically-powered scooter vehicles, both of the rear wheel drive type and the front wheel drive type, use various mechanisms to permit quick and easy assembly and disassembly of the scooter vehicle components, particularly the frame components, preferably by hand and most preferably completely without use of tools. A front wheel drive scooter unit utilizing a lock pin to prevent separation of the front and rear frame components is disclosed in U.S. Pat. No. 5,020,624.

Additional prior art relating to electrically-powered scooter vehicles, particularly to four-wheel electrically-powered scooter vehicles, is U.S. Pat. No. 4,798,255. However, the product disclosed in '255 is disadvantageous respecting many, if not most, of the other scooter vehicles in the prior art. This is because the scooter vehicle disclosed in '255 is not readily disassemblable without use of tools into component parts for transport of the scooter vehicle, in such a disassembled state as component parts or modules, in the trunk of an automobile. As a result, the product disclosed in '255 has not enjoyed the commercial success enjoyed by more advanced, modularly constructed, disassemblable electrically-powered scooter vehicles.

There are many additional prior art patents which relate generally to the invention disclosed herein, but which are believed to be less relevant to the patentability of the inventive concepts disclosed herein than the aforementioned prior art patents. These additional prior art patents are: U.S. Pat. Re. No. 30,867; D.171,318; U.S. Pat. No. 1,268,229; U.S. Pat. No. 1,281,980; U.S. Pat. No. 1,293,958; U.S. Pat. No. 1,296,531; U.S. Pat. No. 1,309,305; U.S. Pat. No. 1,428,907; U.S. Pat. No. 1,459,371; U.S. Pat. No. 2,574,199; U.S. Pat. No. 2,594,034; U.S. Pat. No. 2,696,272; U.S. Pat. No. 2,749,997; U.S. Pat. No. 2,817,406; U.S. Pat. No. 2,973,048; U.S. Pat. No. 2,978,251; U.S. Pat. No. 3,043,389; U.S. Pat. No. 3,079,172; U.S. Pat. No. 3,110,352; U.S. Pat. No. 3,117,648; U.S. Pat. No. 3,190,676; U.S. Pat. No. 3,249,171; U.S. Pat. No. 3,254,734; U.S. Pat. No. 3,369,629; U.S. Pat. No. 3,580,349; U.S. Pat. No. 3,713,502; U.S. Pat. No. 4,037,678; U.S. Pat. No. 4,042,054; U.S. Pat. No. 4,353,567; U.S. Pat. No. 4,452,327; U.S. Pat. No. 4,460,057; U.S. Pat. No. 4,469,188; U.S. Pat. No. 4,541,501; French patent 1,064,076 and United Kingdom patent 2,127,364A.

SUMMARY OF THE INVENTION

In one of its inventive aspects the electrically-powered scooter vehicle disclosed herein embraces manually-operable apparatus for detachably connecting fore and aft portions of the scooter vehicle without use of tools where such apparatus includes means extending generally longitudinally from one of the scooter portions for hookingly releasably engaging a receptacle member connected to the remaining scooter portion. The receptacle member includes a receptacle retainingly receiving the hookingly engaging means. The connecting apparatus resists disengagement of the two scooter portions one from another upon application of longitudinal force to either of the scooter portions, but freely permits disengagement by withdrawal of the means for hookingly engaging the receptacle member from the receptacle upon relative rotation of the portions to position their respective longitudinal axes at an angle to one another.

In the aspect of the invention relating to the apparatus for detachably connecting fore and aft portions of the scooter vehicle, the fore and aft portions are desirably maintained connected together for scooter operation by weight of the fore and aft scooter vehicle portions acting downwardly to urge a curved surface of the receptacle member against the corresponding curved surface of the hooking engaging means, to retain the engaging means within the receptacle member. Most desirably, the engaging means includes a hook extending generally longitudinally and curving transversely, preferably transversely downwardly. The longitudinal surfaces of the hooking means are preferably curved respecting the direction of extension and are preferably upper and lower surfaces of the hook. These curved surfaces preferably have different radii and preferably curve in a longitudinal plane. Most desirably, the curves are arcs which converge, with the upper surface having a larger radius of curvature than the lower surface.

Further respecting the connecting means aspect of the invention, the receptacle preferably includes surfaces which substantially complementally contact the curved surfaces of the engaging means. Most preferably, the surfaces of the engaging means which are transverse to the curved surfaces are planar.

The frame connection means aspect of the invention further includes structure which may be fabricated and having no moving parts which move relative to the frame portions to which the hook and eye portions of the frame connection means are respectively connected. The connection means may further include a spring-loaded safety locking pin, retaining the front and rear connection means portions together when those portions are in mating disposition. The connection means may further include a camming mechanism for releasing the safety locking pin.

In another of its aspects, the scooter disclosed herein is a four-wheel vehicle and includes a frame, a steering member rotatable about an axis extending generally upwardly from the frame with the steering member being rotatable about the axis by an operator of the vehicle, to steer the vehicle. The scooter further includes generally horizontal front axle means connected to the frame and being rotatable about an axis running longitudinally respecting the frame. Wheel mounting means are connected to respective ends of the front axle means and rotate about the longitudinal axis of the scooter unitarily with the axle means.

The wheel mounting means are rotatable about generally vertical axes relative to the axle means. Wheels of the scooter are rotatably connected to the wheel mounting means for rotation about generally transverse axes with respect to such mounting means, with the wheels rotating unitarily with the wheel mounting means about the vertical axes and about the longitudinal axis of the scooter unitarily with the front axle means. A primary steering link may be connected to the steering member for rotation unitarily therewith. Secondary steering links connect the primary steering link to the wheel mounting members and are rotatable therewith about the vertical axes.

The primary steering link may be fixedly connected to the steering member for unitary rotation therewith. The primary steering link may extend in opposite directions from the steering link with secondary steering links being connected to opposite extremities of the primary steering link.

The steering member upwardly extending axis preferably at least conceptually intersects the front axle, specifically the axis of rotation of the front axle. The steering member axis desirably intersects axes of rotation of the wheels when the wheel axes are aligned in the four-wheel version of the scooter.

In one aspect of the steering apparatus of the scooter manifesting the invention, the secondary steering links are co-planar with the primary steering links. The respective steering links may extend in opposite directions from their respective wheel connection means.

In the steering mechanism aspect of the invention, the steering mechanism preferably includes means for limiting angular travel of the steering links relative to the vertical axes about which the wheels are rotatable. Preferably, the means for limiting angular travel of the links relative to the vertical axes are means for adjustably limiting angular travel.

Further respecting the steering mechanism aspect of the invention, there is preferably provided means for resiliently resisting angular travel of the front axle means about the longitudinal axis of the scooter vehicle and, where the front axle means is split into axle means pairs, such angular travel resisting means preferably resiliently resists angular travel of said respective pairs about the longitudinal axis of the scooter vehicle.

The means for resiliently resisting angular travel of the axle means pairs desirably further includes means for limiting rotation of an assembly including the axle means, the wheel mounting means and the wheels about the longitudinal axis of the scooter vehicle.

The rotation limiting means may be fixedly connected to the scooter front frame portion and may include a spring between the frame and the axle means and wheel mounting means assembly for resiliently rotation of the assembly about the scooter longitudinal axis.

In one of its most desirable aspects, the steering mechanism includes means for limiting the rotation of the wheel/wheel mounting means/axle means assembly about the scooter longitudinal axis and includes means for adjusting caster of the wheel. The caster adjusting means may include a threaded shaft and a nut threadedly engaging the shaft and being rotatably movable therealong with the nut bearing upon a fitting portion of the rotation limiting means, thereby to adjust wheel camber by movement of the nut along the shaft.

In yet another of its inventive aspects, the scooter includes an electrical system which includes operator-controlled means for adjustably supplying power from a battery of the scooter to a scooter drive motor to thereby drive the scooter at an operator-selected adjustable rate, means for breaking wheels of the scooter vehicle against rotation a preselected time after the scooter drive motor is de-energized and further includes means for disconnecting the battery from the scooter drive motor responsively to lack of operator-directed operation of the scooter for a predetermined time interval.

In the electrical circuitry shut-off portion aspect of the invention, removing and reinserting a key for the scooter vehicle actuates a timer portion of the circuitry; time-out of the timer portion shuts off the circuitry, thereby preventing inadvertent loss of battery power. Desirably, any forward or reverse movement of the scooter continuously resets the timer and prevents the timer from timing-out.

The scooter further preferably includes an adjustably lockable telescoping tiller for steering the scooter. The adjustably lockable telescoping tiller is positionable about any of a continuum of positions from a relatively upright position to a folded or horizontal position.

The front wheel or wheels of the scooter may be smaller than the rear wheels, thereby providing more compact design with greater room for the operator's feet and legs and further providing a high degree of manueverability for the scooter.

DESCRIPTION OF THE DRAWINGS

FIG. 4 is a bottom view of a fore frame portion of a four-wheel scooter vehicle having steering apparatus manifesting aspects of the invention similar to FIG. 3, showing the front wheels of the scooter adjusted to tow-in.

5

Figure 7:
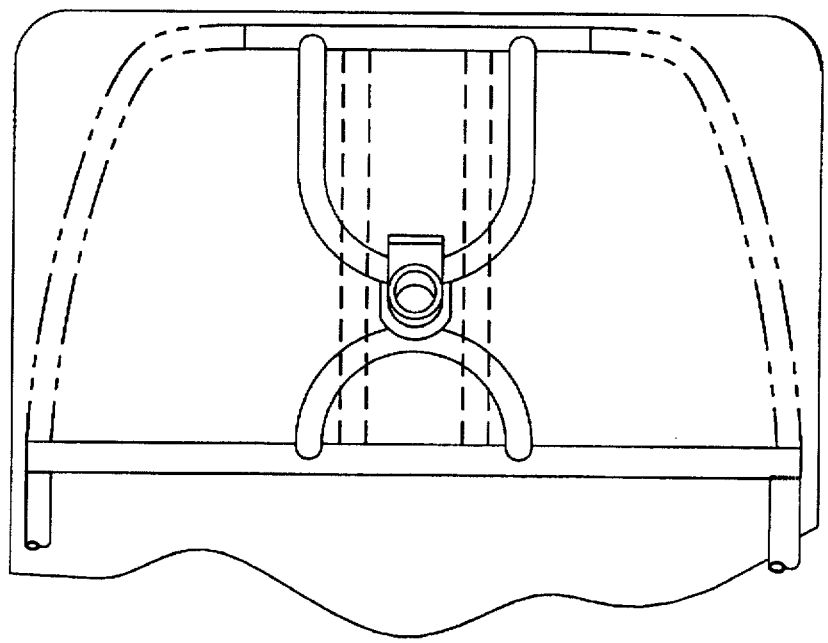
Figure 6:
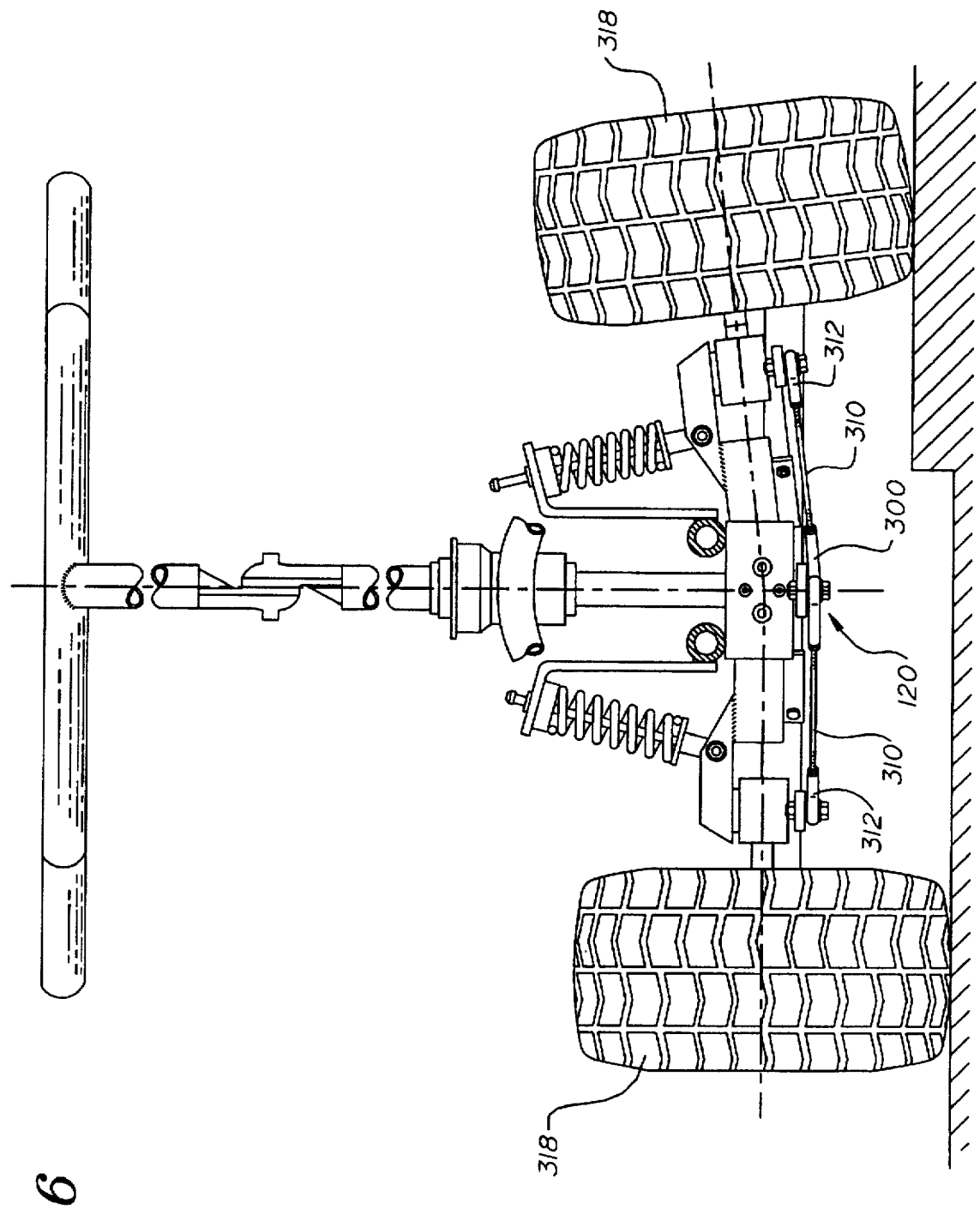
FIG. 6 is a partially broken front view of the four-wheel scooter vehicle steering apparatus illustrated in FIGS. 3, 4 and 5.

FIG. 7 is a partially broken top view of a fore frame portion of a scooter vehicle manifesting aspects of the invention, with the steering apparatuses removed to facilitate clearness of understanding of the fore frame portion, where this fore frame portion can be used with either a three-wheel or a four-wheel scooter vehicle manifesting aspects of the invention.

Figure 8:
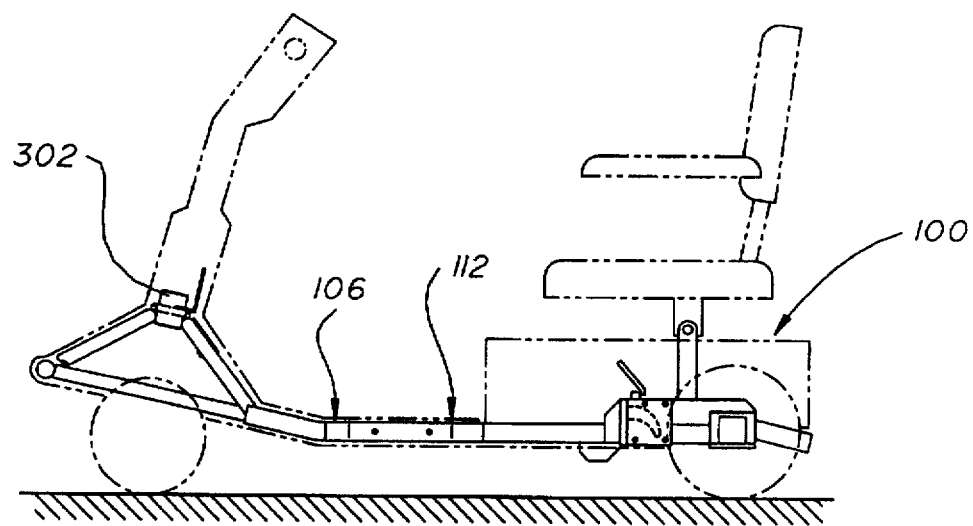

FIG. 8 is a side view of a scooter vehicle manifesting aspects of the invention with the scooter vehicle shown largely in phantom and with the fore and aft sections of the scooter removably connected together.

Figure 9:
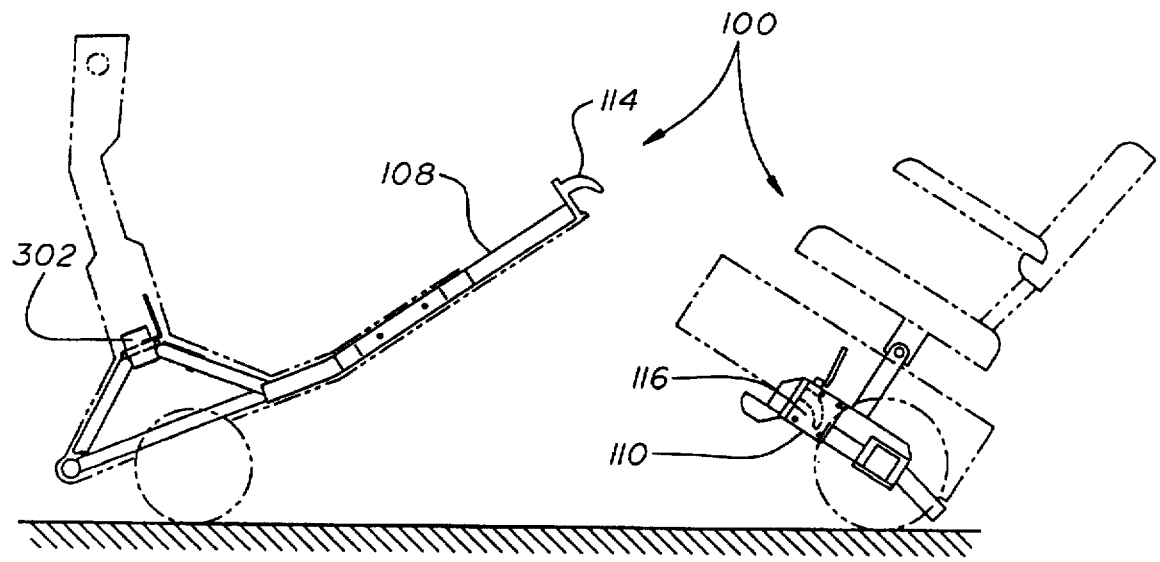

FIG. 9 is a view of the scooter vehicle illustrated in FIG. 8, but with the fore and aft sections of the scooter vehicle disconnected.

FIG. 10 is a side view of the fore frame portion of a scooter embodying aspects of the invention, taken generally at the same position as FIG. 8, illustrating an angularly foldable and length adjustable steering tiller.

FIG. 11 is a side view of the structure illustrated in FIG. 10, illustrating in schematic form the length adjustable feature of the steering tiller.

FIG. 12 is a sectional view of a portion of the steering tiller taken at lines and arrows 12—12 in FIG. 10.

FIG. 13 is a detail of the lower end of the foldable, adjustable length steering tiller illustrated generally in FIGS. 10 and 11.

FIG. 14 is a side view of the structure illustrated in FIG. 13.

FIG. 15 is a detail of the upper end of a steering rod adapted for angularly adjustable mating with the lower end of steering tiller illustrated in FIGS. 13 and 14.

FIG. 16 is a side view of the structure illustrated in FIG. 15.

Figure 17:
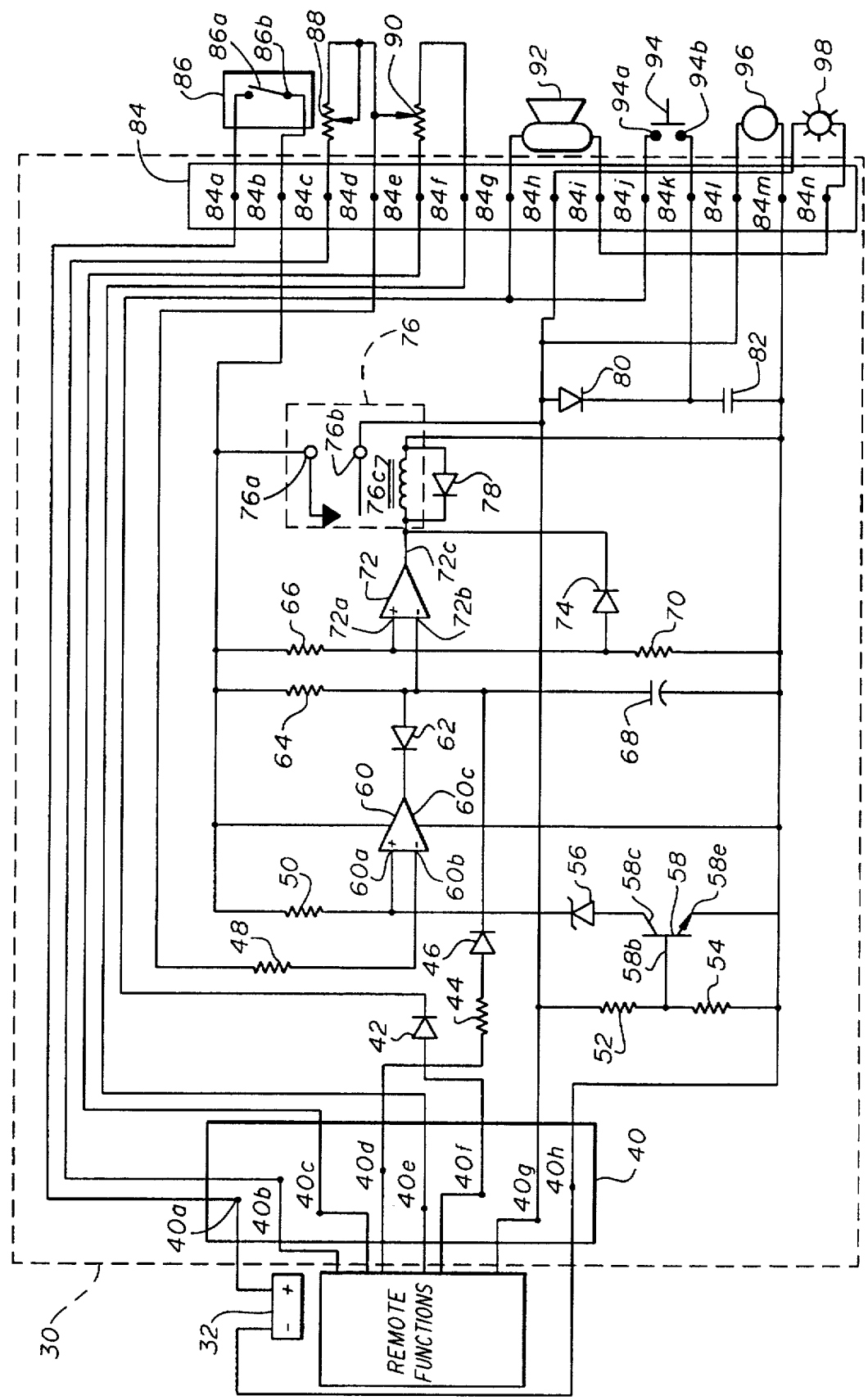

FIG. 17 is a schematic diagram of scooter vehicle electrical circuitry embodying aspects of the invention.

Figure 18:
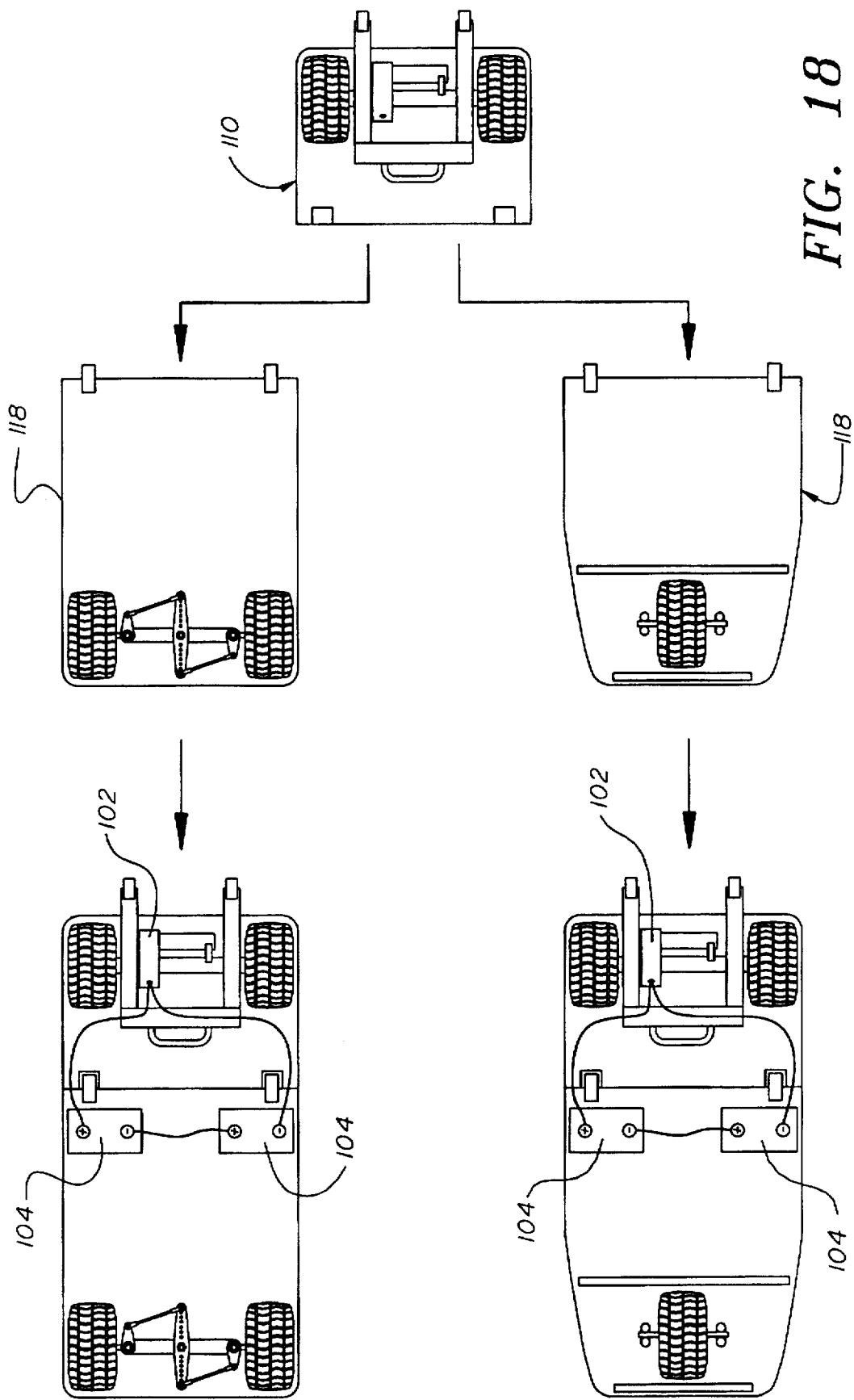

FIG. 18 is a schematic representation illustrating the interchangeability of the two embodiments of the fore frame portion with an aft frame portion to form a scooter embodying aspects of the invention where the scooter may be either a three-wheel, tricycle-type scooter or a four-wheel scooter.

Figure 19:
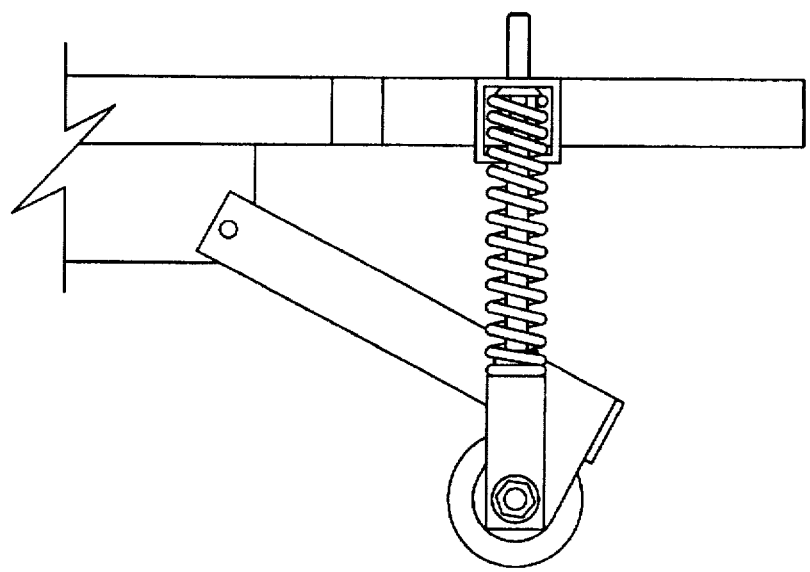

FIG. 19 is a side view of a spring-loaded anti-tip wheel assembly portion of a scooter embodying aspects of the invention.

Figure 20:
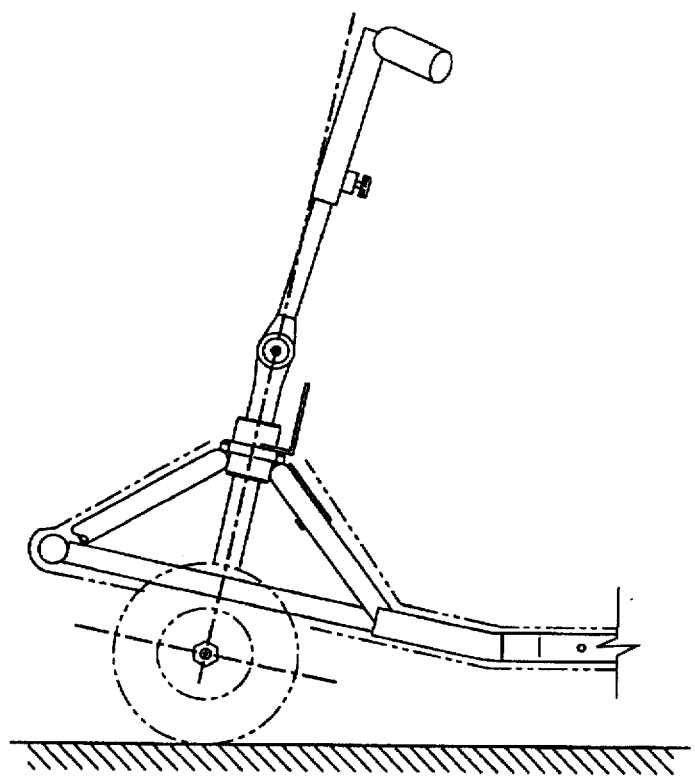

FIG. 20 is a broken side elevation illustrating geometric aspects of the invention.

Figure 21:
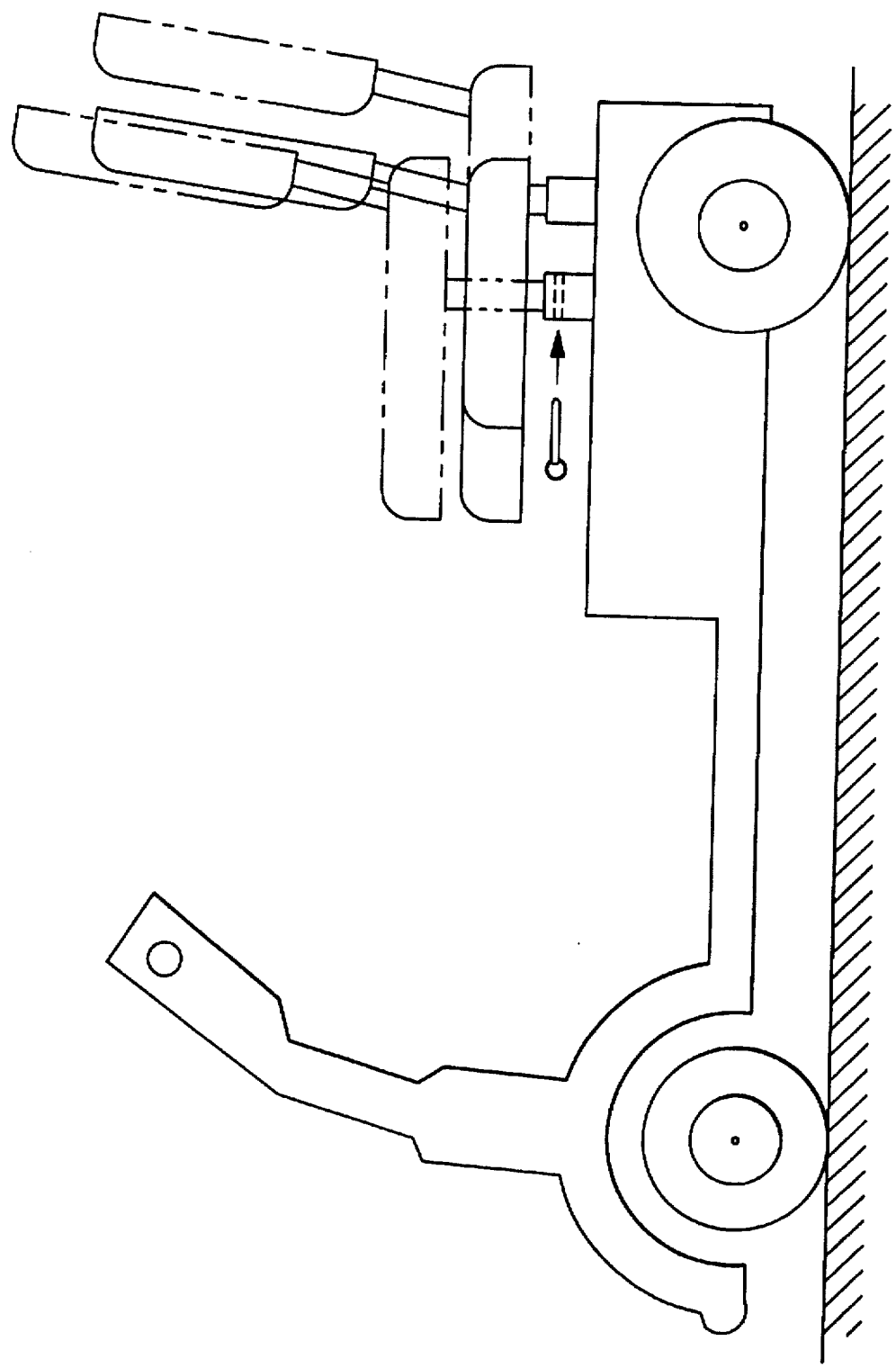

FIG. 21 is a side view generally illustrating a scooter embodying aspects of the invention and specifically schematically illustrating a scooter seat which is adjustable both vertically and horizontally.

Figure 22:
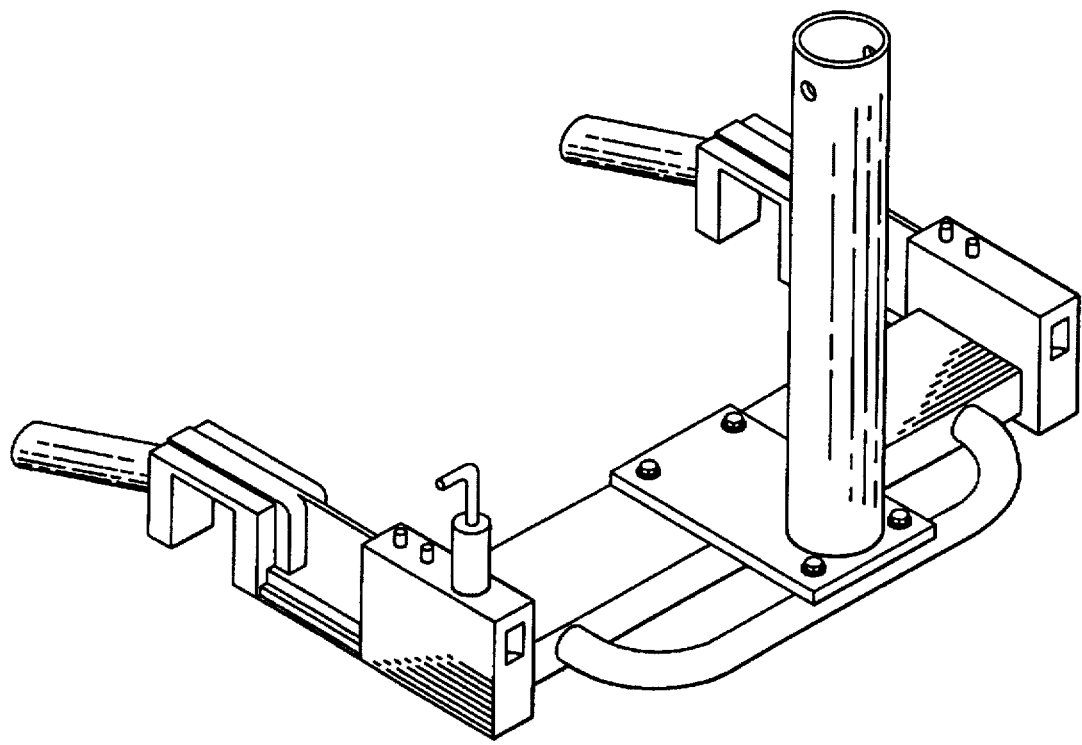

FIG. 22 is an isometric view of an aft frame portion of a scooter embodying aspects of the invention illustrating seat post support structure facilitating adjustable longitudinal movement of a scooter seat between forward and rear positions.

FIG. 23 is a schematic elevation view of scooter vehicle frame connection means embodying aspects of the invention.

Figure 24:
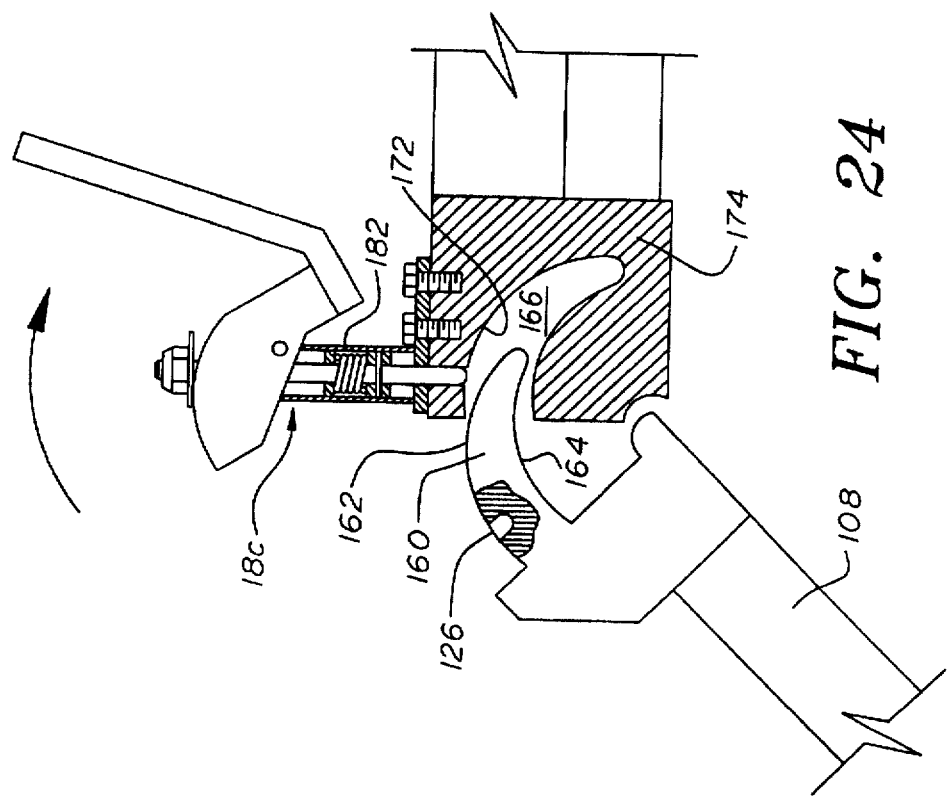

FIG. 24 is a side view, partially in section, showing hook and receptacle portions of scooter vehicle frame connection means embodying aspects of the invention with the hook and receptacle in the course of engagement.

Figure 25:
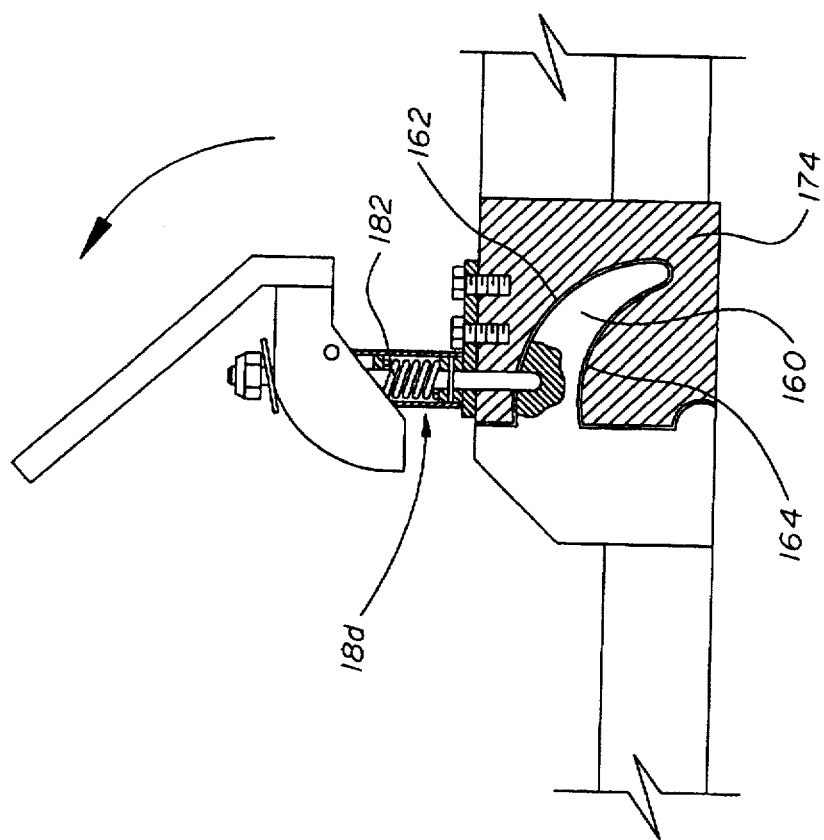

FIG. 25 is a similar side view of the structure illustrated in FIG. 24 showing the hook and receptacle in full engagement and with a safety locking pin in place.

6

Figure 26:
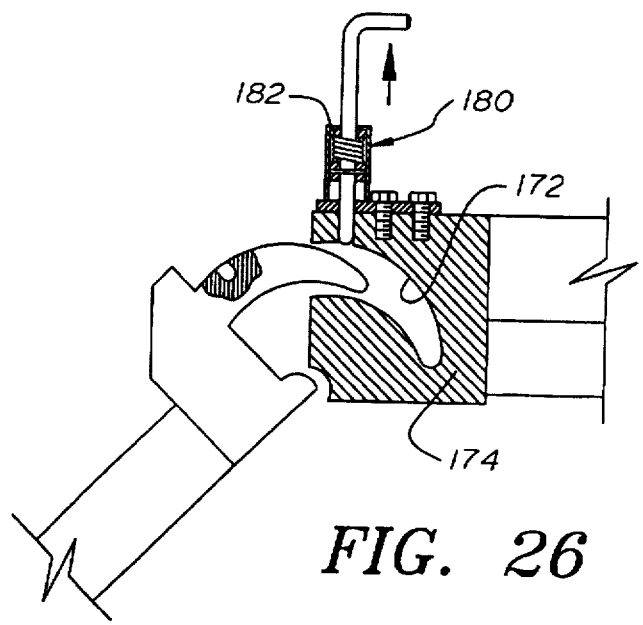

FIG. 26 is an alternate construction of scooter vehicle frame connection means, taken at a position similar to FIGS. 24 and 25 manifesting aspects of the invention.

Figure 27:
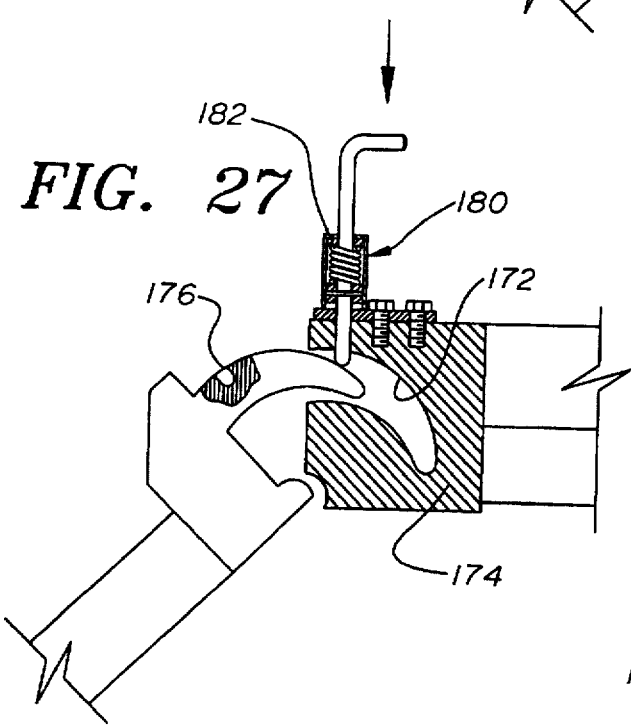

FIG. 27 is a view of the structure illustrated in FIG. 26 with the safety pin portion of the structure in contact with a hook portion of the frame engaging means.

Figure 28:
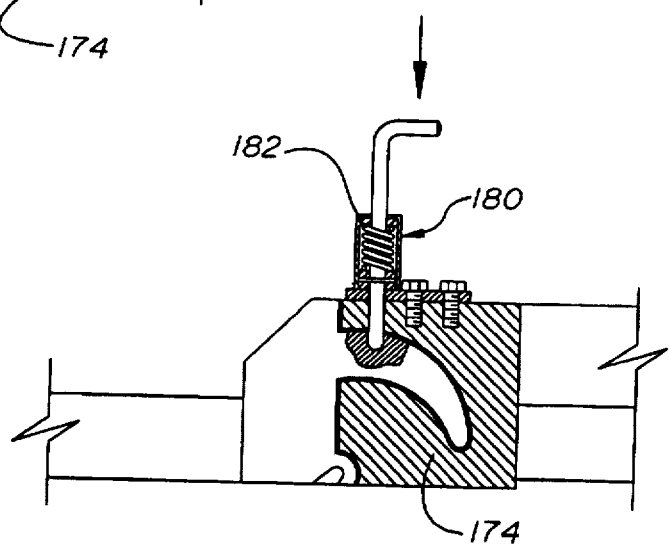

FIG. 28 is a view of the structure shown in FIGS. 27 and 28, with the hook fully engaging the receptacle and a spring-loaded safety pin locking the hook into engagement with the receptacle.

DESCRIPTION OF THE PREFERRED EMBODIMENTS AND BEST MODES KNOWN FOR PRACTICING THE VARIOUS DISCLOSED ASPECTS OF THE INVENTION IN ACCORDANCE WITH 35 USC 112

Referring to the drawings in general and to FIGS. 8, 9, 18 and 23 through 29 in particular, a scooter embodying aspects of the invention is designated generally 100 and includes an electrically powered motor 102 and one or more batteries 104 providing electrical energy to motor 102. Scooter 100 further includes a frame 106 which is disassemblable into two portions, a fore frame portion 108 and an aft frame portion 110. These frame portions 108, 110 are connected together by frame connection means generally designated 112 which includes a hooking means portion 114 and a receptacle means portion 116 for receiving the hooking means. While the drawings have illustrated hooking means portion 114 being attached to the part of fore frame portion 108 and receptacle means 116 being a part of aft frame portion 110, these relationships may equally well be reversed.

The frame connection means 112 is manually operable and permits an operator to detachably connect fore and aft frame portions 108, 110 of scooter 100 without use of tools and without requiring extreme dexterity. This is important that scooter 100 is typically used by an elderly, disabled or infirm person who may be afflicted with arthritis or have other debilitating handicap conditions respecting the fingers and may further be in a relatively weakened condition. The frame connection means resist disengagement of the respective frame portions 108, 110 from one another upon application of longitudinal force to either of frame portions 108, 110; however frame connection means 112 permits free disengagement fore and aft frame portions 108, 110 by withdrawal of hooking means 114 from receptacle means 116 upon relative rotation of fore and aft frame portions 108, 110 to a position at which their respective longitudinal axis are at an angle to one another. This engagement-disengagement motion is illustrated in FIGS. 8 and 9.

Referring specifically to FIG. 23 where hooking means 114 and receptacle means 116 are illustrated schematically, it is to be understood that the scooter longitudinal axis of the scooter frame is horizontal respecting frame connection means 112 illustrated in FIGS. 23 through 29.

Hooking means 114 includes a hook 160 which extends generally longitudinally from the frame portion, which is preferably fore frame portion 108, with which hooking means 114 is associated and to which hooking means 114 is fixedly connected. Hook 160 extends longitudinally and curves downwardly relative to the longitudinal axis of frame 106. Hook 160 has an upper surface 162 and a lower surface 164, both of which are curved. The curves defined by upper and lower surfaces 162, 164 lie in a longitudinal plane which is the plane of the paper in FIG. 23. These curves preferably are arcs, preferably have different radii and the arcs are preferably positioned to converge as illustrated in FIG. 23. Most desirably upper surface 162 has a larger radius of curvature than does lower surface 164.

As can be readily envisioned from FIGS. 8, 9 and 23, connecting means 112 freely disengages upon withdrawal of hooking means 114 and specifically hook 160 from receptacle means 116 and the receptacle form therein, which has been designated 166, upon relative rotation of fore and aft frame portions 108, 110 and respective hooking means and receptacle means fixedly connected thereto to an angle at which respective longitudinal axis of fore and aft frame portions 108, 110 are at an angle to one another which is at least equal to a preselected angle. Such disconnection is easily effectuated by an operator or other person lifting scooter fore frame portion 108 at the extremity thereof where hooking means 114 is located thereby rotating fore frame portion 108 about the scooter front wheel or wheels. Simultaneously, the operator lifts scooter aft frame portion 110 by rotating aft frame portion about the scooter rear wheels. Once there has been sufficient rotation of fore frame portion about the front wheel or wheels and aft frame portion about the rear wheels that the respective longitudinal axis of fore and aft frame portions have reached the preselected angle, hooking means 114 disengages from receptacle means 116. This rotation of fore and aft frame portions 108, 110 and resultant disengagement of frame connection means 112 is illustrated in FIG. 9.

Further respecting the frame connection means 112, reference is made to FIGS. 25 through 29 wherein the preferred embodiments of frame connection means 112 are illustrated in substantial detail, showing the engagement and disengagement of hooking means 114 with receptacle means 116. In the preferred embodiment frame connection means 112 further includes a vertically oriented eye member 170 which is fixedly connected to the frame portion from which hooking means 114 extends, which is preferably fore frame portion 108. Curved surface 172 extends transversely to the longitudinal or horizontal axis of the scooter and is adapted to complementally fit with the exterior of eye member 170 and is further fixedly connected to the scooter portion, preferably aft frame portion 110, to which receptacle means is fixedly connected or of which receptacle means 116 forms a part.

Curved surface 172 has a rounded exterior which facilitates relative pivotal movement of fore and aft frame portions 108, 110 thereabout. Preferably the arc of curved surface 172 is circular. The exterior of eye 170 preferably is arcuate to fit substantially complementally with curved preferably, circular arcuate surface 172.

Receptacle means 116 may be fabricated by forming a receptacle groove in a central block 174 with the groove, denoted schematically as 166, extending transversely through central block 174. Side plates may be provided to sandwich central block 174 and overlie groove 166. In such case such side plates define transverse boundary of groove 166. Such side plates may have longitudinally facing funneling edges or funneling means extending longitudinally towards the hooking means 114. In such case, the funneling means are transversely separated at a longitudinal extremity approximate to the hooking member more than the transverse width of groove 166. In such case, the funneling means serve to guide hook 160 into receptacle 166.

Geometry and configuration of frame connection means 112 and specifically hooking means 114 and receptacle means 116 is not limited to that illustrated in the drawing figures. The hooking means 114 may be configured as a curved tongue extending from one of the frame portions towards the remaining frame portion, with the curved tongue upper and lower surfaces converging to define a tip which is vertically displaced from juncture of the upper and lower surfaces with the frame portion from which the tongue extends.

In such case, the receptacle member may be formed, have a groove therein opening towards the first portion from which the hooking curved tongue extends, with the groove having upper and lower surfaces converging to define a groove bottom which is vertically displaced from juncture of the surfaces with the scooter portion in which the receptacle member is formed. In such case, the tongue fits within the groove with respective upper and lower surfaces complementally contacting along portions thereof which are vertically displaced from juncture of the surfaces with respective fore and aft frame portions. In this manner, the curved tongue and the receptacle colinearly connect the respective frame portions to facilitate operation of the scooter.

Preferably the tongue upper and lower surfaces are concave and defined by continuous transversely elongated ribbon-like surface. Preferably the tip of the tongue is convex and is defined by the continuous transversely elongated ribbon-like, surface with the tip separating the tongue upper and lower surfaces.

Still referring to FIGS. 24 and 25 illustrating the most preferred embodiment of frame connection means 112, hook 160 preferably has a circular bore 176 formed in the upwardly facing surface 178 of the hook. Bore 176 is sized to receive a safety pin 180 mounted on central block 174 and movable vertically with respect thereto. Pin 180 if preferably downwardly biased by a spring 182 which is preferably a coil spring.

Referring generally to FIGS. 10, 11 and 12, the scooter may include a length and angularly adjustable steering tiller 184 forming a part of steering member assembly 118. Steering tiller 184 includes conventional handles for gripping by the scooter operator during scooter operation and has mounted thereon the operator actuated switches for providing power to the motor to propel the scooter and performing other functions discussed herein. Tiller 184 includes steering handles 186 which are preferably fixedly connected to an upper telescoping member 188 which, as best illustrated in FIG. 10, is preferably of rectangular cross-sectioned tubular construction.

Member 188 fits slidably over a lower telescoping member 190 with exterior dimensions of lower telescoping member 190 selected so that the contacting interface between upper and lower telescoping members 188, 190 is a complemental, sliding interface, permitting ready telescoping relative movement between members 188 and 190. Means for fixing telescoping members 188, 190 against relative movement vis-a-vis one another are provided by a threaded shaft 192 which threadedly engages a tapped member 194 which is preferably movably connected to the exterior of upper telescoping member 188, for example, by welding.

Member 194 is positioned on the exterior of upper telescoping member 188 so that shaft 192 passes through an aperture 196 in upper telescoping member 188 in a manner that rotation of shaft 192 results in shaft 192 moving in a direction transverse to the facing wall of lower telescoping member 190. If threaded shaft 192 is advanced sufficiently far to frictionally contact and engage facing surface of lower telescoping member 190, this facing frictional engagement is sufficient to preclude telescoping movement of upper telescoping member 188 with respect to lower telescoping member 190. A knob 198 affixed to an end of threaded shaft 192 facilitates hand rotation of shaft 192. Preferably the means for preventing relative telescoping movement of upper and lower members 188, 190 is positioned so that knob 198 faces the scooter operator. This facilitates positional adjustment of the length of steering tiller 184 as defined by the relative position of upper telescoping member 188 vis-a-vis lower telescoping member 190.

Means for adjustably fixing angular orientation of steering handle 186 vis-a-vis the remaining, fixed portion of steering member assembly 118 is illustrated generally in FIGS. 13 through 16.

Figure 1:
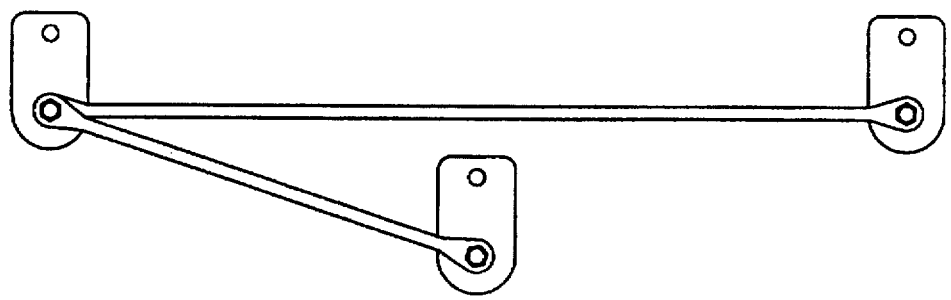
FIG. 1 is a schematic representation of scooter vehicle steering apparatus according to the prior art.
Figure 2:
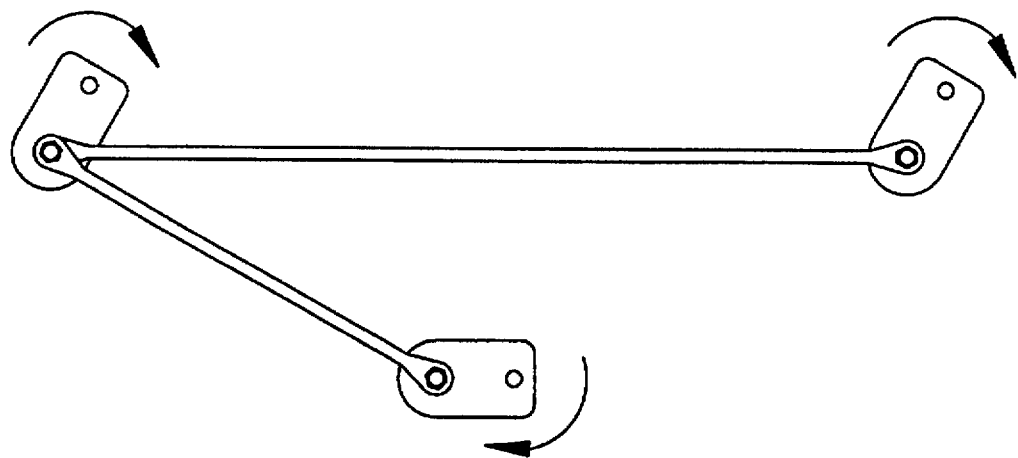
FIG. 2 is a schematic representation of scooter vehicle steering apparatus according to this prior art and as shown in FIG. 1, but with the steering apparatus in a position approaching the disposition at which cam-over can occur.
Figure 3:
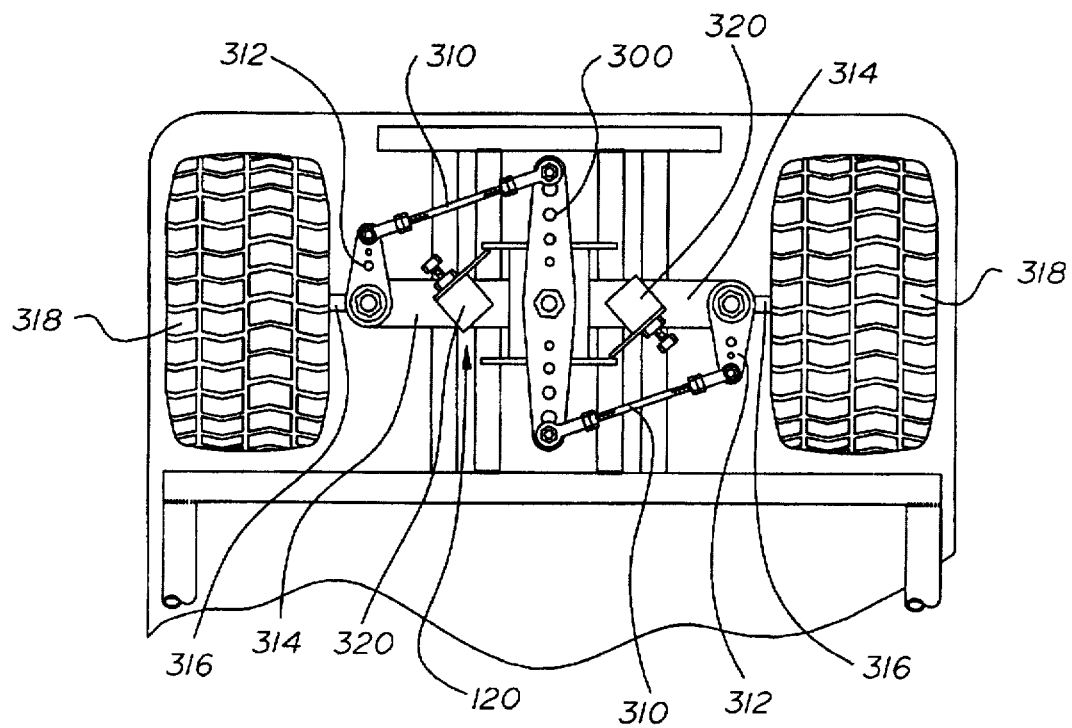
FIG. 3 is a bottom view of a fore frame portion of a four-wheel scooter vehicle having steering apparatus manifesting aspects of the invention.
Figure 4:
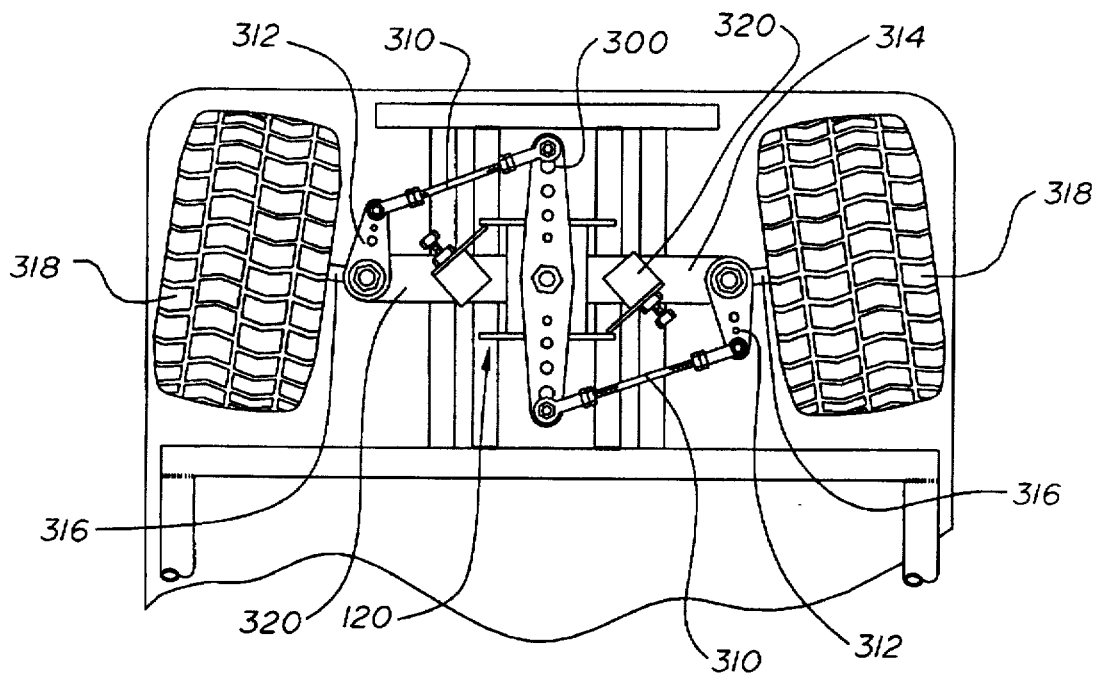
Figure 5:
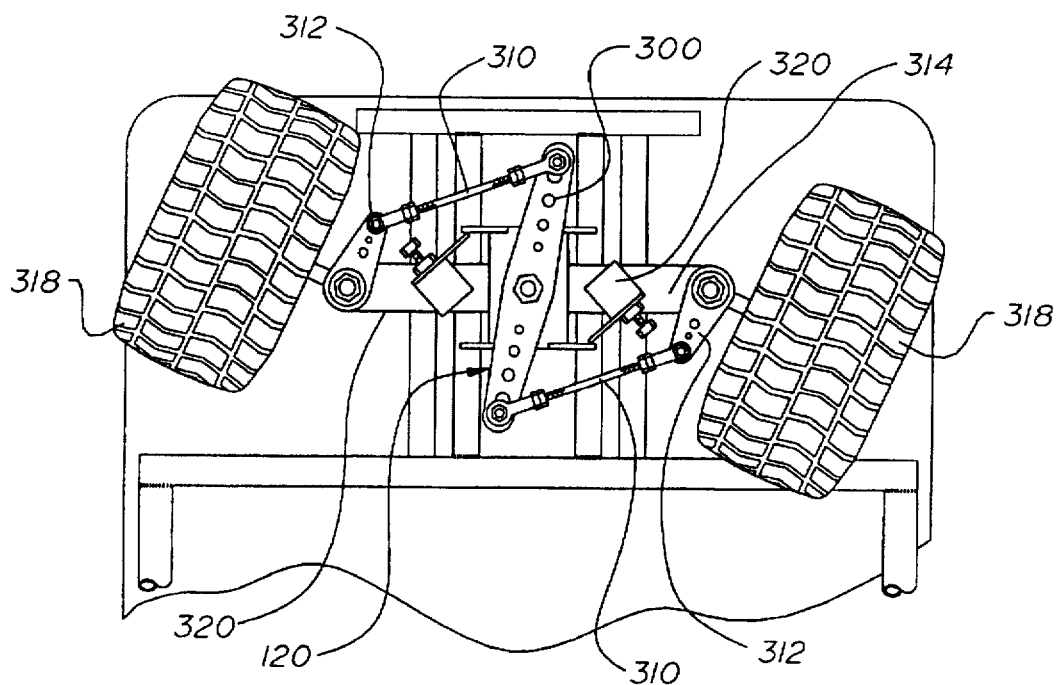
FIG. 5 is a bottom view of a fore frame portion of a four-wheel scooter vehicle having steering apparatus manifesting aspects of the invention similar to FIGS. 3 and 4, showing the scooter front wheels substantially turned.

The four-wheel scooter according to the invention includes steering apparatus which is not susceptible to cam over problems, such as illustrated in FIGS. 1 and 2, which heretofore plagued four-wheel scooter vehicles of the type to which this invention generally pertains. The steering apparatus includes steering member assembly 118 which is mounted on fore frame portion 108 and is rotatable about its axis with respect to frame portion 108. Steering member assembly 118 includes a steering rod 300 journaled in collar 302. Collar 302 is supported above a main portion 304 of fore frame portion 108 by support loop arms 306 welded to main frame portion 304 and extending upwardly therefrom at substantially 45° angles to main frame portion 304.

Steering rod 300 extends downwardly through collar 302. Connected to steering rod 300 at the lower extremity thereof is center steering arm 308 for rotation unitarily with steering rod 300.

Pivotally connected to center steering arm approximate the extremities thereof are a pair of connecting rods 310 which are pivotally connected at their opposite ends to axle block assemblies 312 which are rotatably connected to respective axles 314 of front axle means 120. Axle block assemblies 312 are mounted on axles 314 for rotation about vertical axis respecting axles 314.

Extending from axle block assemblies 312 are stub shafts 316 which are journal mounted within axle block assemblies 312 for rotation with respect thereto. Front wheels 318 are rotatably mounted on stub shafts 316 for carrying the scooter and steering the scooter as it moves.

Fixedly mounted on respective axles 314 are steering limit stop blocks 320. Blocks 320 are preferably welded to axles 314.

Another aspect of this invention relates to a power-saving feature wherein a battery which powers the scooter is automatically disconnected upon expiration of a predetermined period during which the scooter has not been propelled. FIG. 17 shows an electrical circuit 30 that monitors the time interval since last scooter propulsion and turns off 24 volt battery 32 to the scooter at the appropriate time.

Electrical circuit 30 is connected to other electrical components of the scooter through connectors 40 and 84. Pins 40a and 40h are connected to positive and negative leads of battery 32, respectively. Pins 40b, 40c, 40d, 40e, 40f, and 40g are connected to remote functions circuit 34. Pins 84a and 84b are connected to contacts 86a and 86b of key switch 86. Pin 84c, 84d, 84e, and 84f are connected to potentiometers 88 and 90. Pins 84g and 84i are connected to horn 92. Pins 84h and 84n are connected to headlight 98. Pins 84j and 84k are connected to contacts 94a and 94b of horn switch 94. Pins 84l and 84m are connected to meter 96.

Power is provided to electrical circuit 30 by connecting positive lead of battery 32 to pin 40a and negative lead (or ground lead) of battery 32 to pin 40h. Pin 40a is connected to pin 84a which in turn is connected to contact 86a of key switch 86. When key switch 86 is turned by the user of the scooter, an electrical connection is made between contacts 86a and 86b, and power passes through pin 84b to resistor 64 which is connected in series to capacitor 68 and negative input 72b of voltage comparator 72, type LF353, manufactured by Texas Instruments. Initially, capacitor 68 acts like a short thereby setting voltage at negative input 72b to zero volts.

When key switch 86 is actuated, a 24 volt potential is also applied to a voltage divider formed by resistors 66 and 70 establishing a voltage ($V^+$) at positive input 72a which may be calculated as follows: $V^+=(R_{70}/(R_{70}+R_{66})) * V^{in}$. In the preferred embodiment, resistor 70 is set to 100 KΩ and resistor 66 is set to 10 KΩ, thereby establishing a 21.8 volt potential at positive input 72a.

Hence, when power is first applied, the potential at positive input 72a is higher than the potential at negative input 72b resulting in a high level at output 72c. This in turn provides necessary voltage to relay coil 76c so that relay 76 becomes energized and switch contacts 76a and 76b are connected. Although the preferred embodiment utilizes a mechanical relay, type T7431D15-24, manufactured by Potter and Brumfield, other types of relays, including solid state relays may be used.

Relay 76 remains energized until the scooter remains in an unpropelled state for a specified time interval. As previously mentioned, when power is first applied, voltage at negative input 72b equals zero volts. However, as time passes, during which the scooter is not propelled, capacitor 68 starts charging though resistor 64 at an exponential rate define by $e^{-t/RC}$, and voltage at negative input 72b increases.

Capacitor 68 continues to charge until voltage at negative input 72b exceeds voltage at positive input 72a, at which time output 72c changes to a low state and de-energizes relay coil 76c. In the preferred embodiment, resistor 64 has a value of 1.0 MΩ and capacitor 68 has a value of 220 μF. As a result, it takes approximately 10 minutes for voltage at negative input 72b to increase above the level (21.8 volts) set by the voltage divider at positive input 72a. The allowed time period before automatic shut-off may be easily altered by varying values of resistor 64 and capacitor 68, however, it has been established that a range of 8 to 12 minutes is most desirable.

To reduce "chatter" of relay 76, diode 78 is included and operates to reduces back EMF when coil 76c is de-energized. Diode 74 is also included to accelerate transition from a high to low voltage at output 72c. As output voltage starts to fall, diode 74 becomes forward biased and, in effect, disables resistor 70 from electrical circuit 30. Consequently, rather than remaining at a fixed voltage, input 72a "follows" output 72c. This increases voltage differential between inputs 72a and 72b, substantially decreasing high to low transition time at output 72c.

While the scooter is not propelled, capacitor 68 continues to charge as described above. However, when an operator propels the scooter in a forward direction, capacitor 68 discharges, thereby resetting the time period required for automatic shut-off. Discharge of capacitor 68 is achieved by monitoring voltage differential between inputs 60a and 60b of voltage comparator 60, type LF353, manufactured by Texas Instruments.

Positive input 60a is fixed to a value slightly over 6.0 volts. One end of resistor 50, with a value of 1 KΩ, is connected to the switched 24 volt supply provided at pin 84b and the other end is connected to cathode of 6.0 volt zener diode 56. Anode of zener diode 56, in turn, is connected to collector 58c of NPN transistor 58 which is "turned-on" and emitter 58e is connected to ground. While transistor 58 continues to conduct, current flows through resistor 50, and zener diode 56 regulates voltage to positive input 60a at 6.0 volts.

Voltage at negative input 60b is controlled by potentiometer 90. Remote functions circuit 34, contains a 12 volt source with positive lead connected to pin 40e and negative lead connected to pin 40c. Consequently, a 12 volt potential is applied across potentiometer 90 through pins 84e and 84f. The wiper of potentiometer 90 is connected to resistor 48 through pin 84d.

When the scooter is not being propelled, the wiper of potentiometer 90 is set to a middle position resulting in a 6 volt potential at resistor 48. Since the value of resistor 48, equal to 470 KΩ, is significantly larger than total resistance of potentiometer 90, equal to 5 KΩ, voltage at negative input 60b closely follows voltage at the wiper of potentiometer 90, and hence is also at 6 volts when the scooter is not being propelled. When the scooter is propelled in a forward or backward direction, the wiper position of potentiometer 90 changes and accordingly varies voltage at negative input 60b. When the scooter is propelled forward, voltage level at negative input 60b is above 6 volts; when moving backward voltage level is below 6 volts.

Whenever voltage at 60b is equal to or below 6 volts, corresponding to times the scooter is stationary or being propelled backward, output 60c of voltage comparator 60 is "high". Consequently, diode 62 is reverse biased, and capacitor 68 continues to be charged. If, however, voltage at input 60b rises above 6 volts, corresponding to times the scooter is being propelled forward, then output 60c falls to the "low" state. This causes diode 62 to become forward biased allowing capacitor 68 to discharge back to zero volts. As a result, the shut-off timer is restarted.

In addition to the use described above, potentiometer 90 is used in conjunction with potentiometer 88, by remote functions circuit 34, to control speed and direction of the scooter. By varying potentiometer 90, the full range of forward and backward speed may be selected. By varying potentiometer 88, maximum speed, may be selected. Remote function circuit 34 monitors the speed setting at pin 40b and sets scooter speed accordingly.

Transistor 58 functions to further reduce unnecessary power consumption. While relay 76 remains energized, a 24 volt potential is provided to resistors 52 and 54, which are connected in series to ground. Since resistors 52 and 54 are both 10 KΩ, base 58b is set to 12 volts, thus allowing transistor 58 to "turn-on". However, when the timeout period expires, and relay 76 de-energizes, voltage to resistors 52 and 54 is removed, base 58b voltage drops to zero, and transistor 58 ceases to conduct current. As a result, current normally passing through resistor 50 stops to flow and a further power savings is realized.

Electrical circuit 30 has an additional feature that disables scooter operation during battery charging. When the scooter battery 32 is being charged, remote functions circuit 34 asserts pin 40d to a high state causing diode 46 to become forward biased and allowing capacitor 68 to charge at a rate determined by resistor 44, rather than resistor 64. The value of resistor 44 value is substantially smaller than resistor 64, such that the timer shuts off scooter operation within a short time after battery charging commences. In the preferred embodiment, resistor 44 is selected to be 1 KΩ, resulting in scooter shut-off within one second after battery charging begins.

Electrical circuit 30 also provides a means for operating horn 92. When relay 76 is energized, 24 volts is provided to switch contact 94b through diode 80 and pin 84k. Thereafter, any time a user closes switch 94, an electrical connection arises between contacts 94a and 94b. As a result, power is routed into electrical circuit 30 at pin 84j and output to horn 92 through pin 84g. Capacitor 82, equal to 0.1 μF, prevents any electrical noise, produced by horn 92, from feeding back into electrical circuit 30.

Remote horn activation can also be accomplished by remote functions circuit 34 applying a high voltage to pin 40f. This bypasses switch 94 and provides power directly to horn 92 through pin 84g. Diode 80 acts to block the remote activation source from powering electrical circuit 30. Remote horn activation becomes important when the scooter's brake is released, thereby placing the scooter in a "freewheel" mode. Brake release is detected by remote functions circuit 34, and horn 92 is periodically sounded to remind the user to re-enable the brake. As a result, injury is prevented.

Electrical circuit 30 provides connections to other devices. Voltage meter 96 is connected through pins 84l and 84m and headlight 98 is connected through pins 84h and 84n.

While the preferred embodiments of the invention have been described above and alternative embodiments have also been described, the scope of protection to which the invention is believed entitled is defined by the claims and by equivalents thereto which perform substantially the same function in substantially the same way to achieve substantially the same result as set forth in the claims, so long as such substantial equivalents, as defined by a claim for such substantial equivalent, do not read on the prior art.

We claim:

1. An electrically-powered scooter for use by elderly, disabled and infirm persons having separable fore and aft portions, including manually operable apparatus devoid of moving parts for disengagably co-linearly connecting said fore and aft portions without use of tools, being disengaged upon tilting one of said portions relative the remaining portions to a preselected relative angle therebetween, and when connected maintaining said portions along said line of connection in substantially fixed disposition respecting each other in opposition to any force applied to at least one of said portions tending to separate said portions along said line of connection, comprising:

a. means fixedly connected to and extending generally longitudinally from one of said scooter portions for releasably hookingly engaging a receptacle member of a remaining portion;

b. said receptacle member fixedly connected to said remaining portion and having a receptacle therein for retainingly receiving said hookingly engaging means;

c. said hookingly engaging means being insertable into and removable from said receptacle member;

d. said connecting apparatus resisting disengagement of said hookingly engaging means from said receptacle member and hence of said scooter portions one from another upon application of force to either of said portions in the direction of said line of connection but freely disengaging said hookingly engaging means from said receptacle member and hence of said scooter portions one from another upon relative tilting of said portions to position longitudinal axes of said portions at a preselected angle to one another relative to said line of connection;

e. wherein said fore and aft portions are maintained connected together for scooter operation by weight of said fore and aft scooter vehicle portions acting downwardly to urge a curved surface of said receptacle against a corresponding curved surface of said hookingly engaging means to retain said hookingly engaging means within said receptacle member;

f. wherein said receptacle member includes surfaces which substantially complementally contact said curved surfaces of said hookingly engaging means.

2. The scooter of claim 1 wherein said surfaces of said hookingly engaging means that are transverse to said curved surfaces are planar.

3. An electrically-powered scooter for use by elderly, disabled and infirm persons having separable fore and aft portions, including manually operable apparatus devoid of moving parts for disengagably co-linearly connecting said fore and aft portions without use of tools, being disengaged upon tilting one of said portions relative the remaining portions to a preselected relative angle therebetween, and when connected maintaining said portions along said line of connection in substantially fixed disposition respecting each other in opposition to any force applied to at least one of said portions tending to separate said portions along said line of connection, comprising:

a. means fixedly connected to and extending generally longitudinally from one of said scooter portions for releasably hookingly engaging a receptacle member of a remaining portion;

b. said receptacle member fixedly connected to said remaining portion and having a receptacle therein for retainingly receiving said hookingly engaging means;

c. said hookingly engaging means being insertable into and removable from said receptacle member;

d. said connecting apparatus resisting disengagement of said hookingly engaging means from said receptacle member and hence of said scooter portions one from another upon application of force to either of said portions in the direction of said line of connection but freely disengaging said hookingly engaging means from said receptacle member and hence of said scooter portions one from another upon relative tilting of said portions to position longitudinal axes of said portions at a preselected angle to one another relative to said line of connection;

e. wherein said fore and aft portions are maintained connected together for scooter operation by weight of said fore and aft scooter vehicle portions acting downwardly to urge a curved surface of said receptacle against a corresponding curved surface of said hookingly engaging means to retain said hookingly engaging means within said receptacle member, wherein:

i. said hookingly engagable member is in the form of a curved tongue extending from one of said portions towards said remaining portion, having upper and lower surfaces converging to define a tip vertically displaced from juncture of said surfaces with said portion from which said tongue extends;

ii. said receptacle member has a groove formed therein opening towards said first portion, said groove having curved upper and lower surfaces converging to define a groove bottom vertically displaced from juncture of said surfaces with said scooter portion having said groove;

iii. said tongue fitting within said groove with respecting upper and lower surfaces complementally facingly contacting along portions thereof vertically displaced from juncture of said surfaces with respective fore and aft portions to co-linearly connect said portions for operation of said scooter.

4. The scooter of claim 3 wherein said tongue upper and lower surfaces are concave and defined by a continuous transversely elongated ribbon-like surface.

5. The scooter of claim 3 wherein said tip is convex, is defined by said continuous transversely elongated ribbon-like surface and separates said tongue upper and lower surfaces.

* * * * *